(12) United States Patent
Berg

(10) Patent No.: US 7,897,666 B1
(45) Date of Patent: Mar. 1, 2011

(54) RELEASE LINER

(76) Inventor: Daniel Berg, Elm Grove, WI (US)

( * ) Notice: Subject to any disclaimer, the term of this patent is extended or adjusted under 35 U.S.C. 154(b) by 302 days.

(21) Appl. No.: 12/138,757

(22) Filed: Jun. 13, 2008

Related U.S. Application Data

(60) Provisional application No. 60/944,200, filed on Jun. 15, 2007.

(51) Int. Cl.
*C08K 5/5419* (2006.01)

(52) U.S. Cl. .......... 524/268; 528/25; 528/30; 525/474

(58) Field of Classification Search ............ None
See application file for complete search history.

(56) References Cited

U.S. PATENT DOCUMENTS

| | | | | |
|---|---|---|---|---|
| 2,684,336 | A | * | 7/1954 | Moreton ............ 508/215 |
| 4,308,063 | A | * | 12/1981 | Horiuchi et al. ......... 106/38.22 |
| 5,403,891 | A | * | 4/1995 | Romenesko ............ 525/106 |
| 5,708,084 | A | | 1/1998 | Hauenstein et al. |
| 5,708,085 | A | | 1/1998 | Hauenstein et al. |
| 5,844,031 | A | * | 12/1998 | Chen et al. ............ 524/264 |
| 6,080,489 | A | | 6/2000 | Mehta |
| 6,441,086 | B1 | | 8/2002 | Wolfer et al. |
| 7,105,233 | B2 | | 9/2006 | Bechthold et al. |
| 7,250,127 | B2 | | 7/2007 | Geck et al. |
| 2007/0276078 | A1 | * | 11/2007 | Pottier et al. ......... 524/492 |

FOREIGN PATENT DOCUMENTS

| | | | |
|---|---|---|---|
| EP | 0 254 050 | B1 | 1/1995 |
| EP | 0 522 024 | B1 | 6/1995 |

OTHER PUBLICATIONS

Derwent abstract of KR 2003/031363.*

* cited by examiner

*Primary Examiner*—Marc S Zimmer
(74) *Attorney, Agent, or Firm*—Boyle Fredrickson SC

(57) ABSTRACT

The present invention is a release liner including a film formed of a thermoplastic polymer and a non-migratory silicone additive. The additive is formed with a siloxane polymer that can be added directly to the thermoplastic polymer prior to compounding the thermoplastic polymer into an extrudable release liner film. The additive provides the desired release properties to the film, and due to bonds formed between the siloxane polymer and a binding component added to the siloxane polymer during formation of the additive, as well as the high molecular weight of the siloxane polymer, is non-migratory.

9 Claims, No Drawings

RELEASE LINER

CROSS-REFERENCE TO RELATED APPLICATIONS

This application claims priority from U.S. Provisional Patent Application Ser. No. 60/944,200, filed on Jun. 15, 2007, which incorporated by reference herein in its entirety.

FIELD OF THE INVENTION

The present invention relates to release liners, and more specifically to a release liner formed with a non-migratory, ultra high molecular weight silicone component.

BACKGROUND OF THE INVENTION

Release liners are films or papers used for the release from adhesives, adhesive laminate constructions, or mastics in industrial operations. The term release liner is also used for films and papers that are used to cover and subsequently release from various objects, materials or parts, such as in molding operations or when handing certain types of materials. However, even though they are viable for this particular application, these types of release liners are used quite differently from those liners used in covering adhesives. Consequently, release liners used to cover various parts and objects, as opposed to adhesives, have very different performance criteria, which are generally much less stringent than those criteria applicable to liners used to cover adhesives. For example, many of the release liners used to cover various parts and objects are not sensitive to migration or adhesive release levels, as the liners do not contact an adhesive on the part or object to which they are secured.

With respect to those release liners used to cover and protect adhesives, "release level" and "release profile" are collective terms used to describe the behavior of the adhesive and release liner assessed by a number of test criteria used in measuring the tension needed to pull an adhesive away from the release liner. Most release liners must have some tension or adherence to the adhesive against which they are applied to keep the liner in position over the adhesive, and yet should be able to be pulled off of the adhesive at the correct speed and force to function properly. The release tension profile for a release liner is a very complex phenomenon.

For liners that are to be used in adhesive constructions, the release liner industry commonly uses silicone release coatings applied over polymeric film substrates to generate liner stock. Polyethylene terepthalate, polyethylene and polypropylene are common polymer film substrates for these liners, preferred grades of which are commonly known in the art. To coat these polymeric films with the silicone coating, the polymeric film must normally be corona-treated or ozone treated after it has been formed in an extrusion process to facilitate the bonding of the silicone coating to the substrate. The polymeric film is then coated with the silicone composition and cured in a suitable manner before it can be used as a release liner in a laminate assembly. Common curing methods include subjecting the silicone coating to infrared radiation, electron beam radiation, UV radiation or heated forced air to produce a dry stable silicone coated surface that will function to control the release of adhesives.

In addition to the silicone coating and curing steps being highly capital cost intensive with high operation and maintenance costs, one significant issue with the process of forming release liners in this manner is that the step of coating and subsequently curing the silicone composition onto the polymeric film introduces a wide array of variables that can detrimentally affect the proper adhesion and the correct release levels of the final film. More particularly, the release liner must be formed with the polymeric substrate and silicone coating to have a good subsequent release, i.e., the adhesive covered by the liner must have good adhesive strength after the laminate including the adhesive has been aged and released from the liner. A common problem that arises in the use of liners including the silicone coating applied in this manner is the migration of loose silicone fluid, usually in the form of uncured silicone polymer or residual oils and process fluids, from the liner onto the adhesive. As a result of this migration, the re-adhesion of the adhesive to an object other than the liner is significantly reduced.

The prior art includes a number of examples of silicone materials compounded into thermoplastic resins that produce a variety of properties. For example, U.S. Pat. Nos. 5,708,084 and 5,708,085 teach polyolefin compositions which can be extruded at relatively high rates to provide extrudate having increased hydrophobicity, said compositions comprising (A) 100 parts by weight of a thermoplastic resin; (B) 1 to 5 parts by weight of an interactive diorganopolysiloxane process aid, said diorganopolysiloxane having a number average molecular weight of at least 10,000. However, in these references, the description includes discussion of how the siloxane migrates to the surface of the plastic material, creating the desirable properties for the composition disclosed ion those references, which is directly opposite to the requirements for a release liner to be utilized on adhesives.

In addition, U.S. Pat. No. 6,080,489 discloses such a composition that exhibits surprisingly improved properties, such as having reduced coefficient of friction, consistent coefficient of friction over time, increased hydrophobicity and improved abrasion resistance. The composition includes (A) 100 parts by weight of a thermoplastic resin; (B) at least 0.5 parts by weight of a siloxane blend having both a high molecular weight (Mw) siloxane and a low Mw siloxane, where the high Mw siloxane has a viscosity greater then the low Mw siloxane. The blend of slioxanes disclosed provides the increased beneficial characteristics for the resulting products formed from the material. However, as with the previous references, other than the variation of the composition of the siloxane blend, there is nothing disclosed in the composition that effectively prevents the siloxanes from migrating to the surface of the product.

As a result, with the compositions disclosed in these references, migration of the composition may still occur because there is nothing to tether it into the polymer matrix. For this reason, the silicone additive concentrates disclosed in these references are not suitable for and have not found widespread use in commercial release liner films.

In U.S. Pat. No. 7,105,233, this reference teaches the use of organo-modified siloxanes for use as a surface modifier additive for polyolefin films which can be employed as a release liner. However, this composition also suffers from potential migration of the siloxane to the surface of the film because the siloxane is only embedded into the composition through the use of mechanical shearing forces prior to an extrusion process, and is not intertwined or otherwise bound in any manner into the system. Thus, the siloxane additive can migrate and subsequently interfere with re-adhesion of an adhesive. Additionally, the siloxanes of this invention contain Si—O—C bonds which are susceptible to hydrolytic degradation, further reducing adhesive performance stability over time.

As a result, each of these alternative silicone additive compounds has certain problems associated with it, for example, difficulties in adequately locking or binding the particular silicone compound in the polymer forming the liner, the costs of the particular additive compound and the chemical complexity of the compounds and the consequent potential interactions, i.e., migration, of the compound and other components of the release liner or the adhesive to which the liner and silicone compound are applied.

Other prior art examples include EP-A 254 050, which describes the production of a release liner by extruded application of a release agent comprising a organopolysiloxane compound that has been reacted with hydrocarbon compounds, and WO 91/15538 that describes release films comprising a base polymer and additive formed with a hard segment polymer to determine the compatibility with the base polymer, and a soft segment polymer which can be a polydiorganosiloxane polymer. However, neither of the materials disclosed in these references are capable of producing a commercially effective release liner.

Therefore, it is desirable to develop a siloxane additive for use in the formation of a release liner that does not migrate from the release liner onto the adhesive to detrimentally affect the release properties and the adhesion properties of the adhesive over which the release liner is applied. It is also desirable to develop a silicone-based additive having these benefits that is also economically feasible and easy to produce.

SUMMARY OF THE INVENTION

According to one aspect of the present invention, a migration-resistant additive is provided for use in release liner compositions, the additive including a polydiorganosiloxane and a binding agent capable of hydrogen bonding with polydiorganosiloxanes. More particularly, the additive is comprised of a high molecular weight diorganopolysiloxane having a viscosity of greater than 50 Pa·s and capable of hydrogen bonding with a binding agent or component having a number of hydroxyl groups thereon that is added to the diorganopolysiloxane polymer during the formation of the additive.

According to another aspect of the present invention, the additive is used to form release liner compositions having: (A) a thermoplastic polymer and (B) the migration resistant additive including a polydiorganosiloxane and a binding agent capable of hydrogen bonding with polydiorganosiloxanes. More particularly, the present invention relates to a composition comprising: (A) 100 parts by weight of a thermoplastic resin; and (B) at least 0.1 part by weight of a non-migratory silicone additive that preferably takes form of a high molecular weight diorganopolysiloxane having a viscosity of greater than 50 Pa·s and a binding agent or component having a number of hydroxyl groups thereon that added to and capable of hydrogen bonding with the diorganopolysiloxane polymer during the formation of the additive. When added to the primary polymer or resin, the hydroxyl groups on the binding agent can also form hydrogen bonds with the polymer or resin, thereby bonding the additive in position with regard to the polymer or resin, and preventing any migration of the additive with regard to the polymer or resin.

According to still another aspect of the present invention, the migration-resistant additive composition provides a method of producing a thermoplastic composition having improved release and enhanced demolding capabilities. More specifically, the non-migratory silicone additive is used as a process additive that is incorporated into the polymer to be used as the primary component of the release liner. The non-migratory silicone additive is compounded into the polymer in a manner that, as a result of the chain length and morphology of the additive, enables the additive to intertwine with the primary component polymer matrix, preventing any migration of the additive from the polymer. Further, the form of the migration-resistant additive enables the additive to be added to directly to the polymer melt, which can then be mixed and extruded directly into a release film or liner.

According to another aspect of the present invention, the use of the migration-resistant additive as a process additive during the process for forming the film to be used as the release liner eliminates the requirement for a separate step in as in prior art processes where a silicone release layer is applied to, and subsequently treated on the surface of the extruded film layer.

According to still another aspect of the present invention, the migration-resistant additive and the release liner formed with the additive are each formed from easy to prepare or commercially available components, thereby improving the commercial economic viability of the release liner.

Other aspects, features and advantages of the present invention will be made apparent from the following detailed description.

DETAILED DESCRIPTION OF THE INVENTION

The present invention is, in part, a release liner formed as a mixture of a suitable thermoplastic polymer film (A) and a migration-resistant, or non-migratory siloxane polymer additive (B). The additive is formed of a polydiorganosiloxane and a binding agent capable of hydrogen bonding with the polydiorganosiloxanes. More preferably, the additive is comprised of a high molecular weight diorganopolysiloxane having a viscosity of greater than 50 Pa·s and a binding agent or component having a number of hydroxyl groups thereon that is capable of hydrogen bonding with and added to the diorganopolysiloxane polymer during the formation of the additive.

In the additive compositions of the present invention, the binding agent bonds with the siloxane polymer in part due to the bonding of the siloxane polymer to the binding component via hydrogen bonding during the formation of the additive composition. The phenomenon and mechanisms associated with hydrogen bonding of various types of polydiorganosiloxanes are well described in the art. These bonds are very strong and dynamic and render the siloxane polymer tethered or bound to the binding component when admixed with one another. In addition, when the additive formed with the siloxane polymer and the binding agent are added to the polymeric film selected for the release liner, the additive has increased chain entanglement with the film. This maintains the additive stationary within the film, rendering the additive non-migratory within the polymer forming the film.

Concerning those thermoplastic resins that can constitute the component (A) of the invention are preferably polyolefins, but can be other thermoplastic resins and plastomers as well, such as nylons, polyesters, polystyrenes, polyurethanes and acrylic resins, among others. As used herein, the term "thermoplastic resin" is meant to include those polymers which soften when exposed to heat and then return to original condition when cooled to room temperature. In the case where the thermoplastic resin is a polyolefin, it may be selected from homopolymers of olefins as well as interpolymers of one or more olefins with each other and/or up to about 40 mole percent of one or more monomers which are copolymerizable with the olefins. Component (A) may also be a blend of two or more of the above mentioned homopolymers or interpolymers.

Preferably, the thermoplastic polymer or resin (A) has a density of about 0.850 to 1.400 g/cc, more preferably 0.875 to 0.960 g/cc, and weight average molecular weight of about 40,000 to about 200,000. The thermoplastic resin (A) may be made by any methods known in the art, such as using Ziegler Natta type catalysts and metalocence based catalysts i.e. single site catalysts, or may be produced by a condensation type polymerization. The above polymers are well known in the art and further description thereof is considered unnecessary.

The siloxane polymer or blends thereof utilized in the additive (B), in addition to being capable of hydrogen bonding with the binding agent and optionally forming a limited amount of covalent bonds with the binding agent, preferably takes form of a high molecular weight diorganopolysiloxane. More preferably, the diorganopolysiloxane has a viscosity of greater than 50 Pa·s. Additionally, the diorganoploysiloxane has an average molecular weight (Mw) of at least about 60,000 atomic mass units (amu), and more preferably between about 75,000 amu to about 2,000,000 amu. In addition, the siloxane polymer can have a number of side chains attached to the main polymeric chain. The groups or radicals that can form these side chains on the siloxane backbone can include, for example, C1-C60 alkyl groups, aromatic rings, hydrogen, hydroxyl groups, vinyl groups and phenyl groups, among others.

The siloxane polymer molecule used to form the additive is selected to be a large molecule. In addition to the bonding interaction between the siloxane polymer and the biding agent, the size of the siloxane polymer aids in fixing the additive to the thermoplastic film component, thereby helping to prevent the migration of the siloxane polymer. In particular, the large siloxane polymer molecule can physically wrap around and become entangled with the polymeric film component.

The additive composition of the present invention additionally contains a binding agent. The binding agent is any material capable of forming hydrogen bonds with the siloxane polymer to bind the siloxane polymer and the binding agent to form the additive. Additionally, because of potential reactivity of the functional groups associated with hydrogen bonding, the binding agent can form covalent bonds with the siloxane polymer under certain circumstances, further enhancing the bonding between the siloxane polymer and the binding agent.

The binding component can take various forms, including a solid particle mentioned above, e.g., silica, a suitable resin material, such as a siloxane based MQ resin, a metal hydroxyl-containing molecule, or an inorganic or organic acid having multiple hydroxyl groups thereon, such as boric acid or phosphoric acid, among others, so long as the binding agent is able to form a sufficiently strong hydrogen bond with the siloxane polymer to provide the non-migratory function to the additive. In particular, the binding component possesses surface hydroxyl functional groups to induce hydrogen bonding with the side chain groups disposed on the backbone of the siloxane component. In another embodiment, the binding agent is selected from group consisting of an inorganic or organic acid having multiple hydroxyl groups thereon which is not boric acid, such as phosphoric acid, MQ siloxane resin and fumed silica.

In addition, it may be necessary to employ other process or treating aids commonly known in the art of silicone preparations, to improve mixing and processing of the siloxane and binding components to form the additive. One example of such a process aid is a short chain di-hydroxy endblocked polydimethyl siloxane. Yet another known process aid that can be added to the mixture of the components for the additive of the present invention is a silane. Other process aids may be shorter chain diorganopolysiloxanes containing dimethyl, methyl phenyl and methyl vinyl siloxane segments. These process aids are used to assist in the formation of the additive of the present invention, but do not directly effect the final release liner produced from this invention.

The release liner compositions of the present invention are prepared by thoroughly dispersing at least 0.1 part by weight of siloxane additive composition (B) in 100 parts by weight of thermoplastic polymer (A). Higher amounts of the additive component (B) of between about 0.1 part to 50 parts can be used to form a masterbatch or concentrate of the composition for further processing. For finished release liners formed using the composition having the thermoplastic polymer (A) and the additive (B), it is preferred that about 0.1 to less than 10 parts by weight of component (B) are used for each 100 parts by weight of component (A).

For use with the thermoplastic polymer (A), the additive (B) can be formed as a fluid or as a solid, e.g., small particles, granules or pellets, that can be added directly to the thermoplastic polymer (A) during processing of the release liner composition. Further, the dispersion of the additive (B) into the thermoplastic resin (A) may be accomplished by any of the traditional means for mixing additives into thermoplastic resins at elevated temperature. For example, the two components (A) and (B) may be blended in a twin-screw extruder, a Banbury mixer, a two-roll mill or a single-screw extruder, either with or without a mixing head. The equipment used to mix these components is thus not critical as long as a uniform dispersion of (B) in (A) is attained. Preferably, the dispersed particle size is no larger than about 40 micrometers.

In addition to the above components (A) and (B), the release liner compositions of the present invention may also contain one or more of the following components: fillers, cure agents, lubricants, ultraviolet light stabilizers, antioxidants, catalyst stabilizers, flame retardants and other process aids commonly employed in the modification of polyolefins. Moreover, up to 5% by weight of their total composition of the present invention could be an antiblock agent, and flame retardants can added to the total composition. Specific non-limiting examples of the above additional ingredients include the following substances: diatomaceous earth, octadecyl-3-(3,5-di-5-butyl 4-hydroxyphenyl)propionate, bis(2-hydroxyethyl) tallowamine, calcium stearate, N,N-bis(2,2,6,6-tetramethyl-4-piperidinyl)-1,6-hexanediamine polymer with 2,4,6-trichloro-1,3,5-trizaine and 2,4,6-trichloro-1,3,5-trizaine and 2,4,4-trimethyl 1,2-pentanamine, dimethyl succinate polymer with 2,2,6,6-tetramethyl-1-piperridineethanol, 2,2-thiobis)-4-tert-octylphenolato]n-butylamine nickel, tris (2,4-di-tert-butylphenyl)phoshite, bis(2,4-di-t-butylphenyl) pentaerythritol diphosphite, trisnonylphenylphospite, polyethylene glycol, Erucamide, titanium dioxide, titanium dioxide, alumina, hydrated alumina, talc, 2-hydroxy-4-n-octyloxy-benzophenone, silicone dioxide, zinc oxide, zinc sulfide, and zinc stearate.

When the thermoplastic resin (A) and additive (B) are compounded into the film used to form the release liner, the additive (B) self-assembles into microscopic cells/domains within the film. These domains are very non-adhering to adhesives over which the release liners formed by the film will be positioned. In particular, the chain entanglement and binding properties of the components of the additive (B) will prevent the individual molecules of the additive (B) from adhering to the adhesive upon removal of the release liner including the additive (B), and thus will not negatively affect the subsequent adhesion of the adhesive to another substrate.

One embodiment of the composition for the non-migratory siloxane additive is the combination of a high molecular weight silicone gum, such as Shin-Etsu KE76 BS, sold by Shin Etsu Chemical Co. of Tokyo, Japan, in an amount of around 100 parts by weight, with a binding agent, such as Aerosil 200 fumed silica, sold by Degussa of Frankfurt, Germany, in an amount of 30 parts by weight, and optionally an appropriate part by weight of a process aid, such as Dow Corning CD 4-2737 hydroxy terminated dimethylsiloxane process aid sold by Dow Corning of Midland, Mich. The addition of a silicone additive with a silicone or siloxane polymer of this high molecular weight provides the polymer film used as the release liner with a component that functions to provide the desired release level to a release liner formed of the polymer and additive. Further, the ultra high molecular weight and long chain length of the non-migratory silicone additive enables the additive to become entangled with the polymer, such that the additive cannot migrate out of the polymer.

Another embodiment of the inventive composition is the combination of a thermoplastic film grade resin and up to 15% of the commercially available additive Genioplast P sold by Wacker Chemical. The Genioplast P is a mixture of high molecular weight polydiorganosiloxane and silica with other process additive that unlike other commercially available silica and polydiorganosiloxane compounds is induced and allowed to hydrogen bond. Surprisingly, when dispersed into a thermoplastic polymer melt, the Genioplast P hydrogen bonding mechanism is not disrupted and the silica and siloxane complex remains in tact and remains non-migratory in nature. This surprising property allows the combination of a film grade thermoplastic resin and the Genioplast P useful as a release liner.

In a particularly preferred embodiment, the composition of a release liner formed with the novel non-migratory additive includes: a) 100 parts by weight of a polymer capable of producing filmic release tapes and liners such as polyethylene terepthalate (PET), polypropylene (PP), or polyethylene (PE), among others; b) between 0.1 to less than 10 parts by weight of the non-migratory additive; and c) optionally 0.001 to 120 parts of other known polymer film additives such as fillers, pigments, process aids, stabilizers and melt flow modifiers. These components are admixed with one another in a suitable manner to arrive at a composition that can be extruded into a film, which can be directly employed as a release liner, i.e., that is ready for use as a release liner or tape as it is extruded. Yet another embodiment of this invention is the use of a mixture of siloxanes of various molecular weights and organo-functionalities in conjunction with a binding component or agent, or a blend of agents.

In the method of the present invention for forming the release liner including the non-migratory additive, the method enables the production of economically viable film release liner by the simple addition of a non-migratory additive to the polymer for the film. This method eliminates the need for silicone coating and curing stations, as required by prior art release liner formation methods, dramatically reducing the costs and capital required to produce these liners and tape backings. It also reduces the number of variables that contribute to a release profile for the liner. This is due to the fact that the chemistry of the non-migratory additive is very simple and predictable, such that the subsequent adhesion and ageing profiles of the liners so formed are easier to control. This results in commercially viable liner constructions that can be used in, but not limited to, traditional applications such as tapes, merchant release liner films for adhesive labels, co-extruded poly coated papers, hot melt adhesive backing, roofing shingle tape and packaging tapes, among other applications.

Additionally, this method of production for the liner including the bound, non-migratory silicone additive can be used in forming a single or multiple layer extruded film. In the embodiment of a multilayer film, the addition of the silicone additive to the outside layers of a co-extruded layered film allows for a reduction of the use of the silicone additive, while also allowing for printing on the opposite side of the film from the silicone additive containing layer.

EXPERIMENTAL

The following experimental examples are provided for reference and are not intended to limit the application of the inventive composition.

Additive A is a commercially available alkyl-modified siloxane used in high temperature release and lubricant applications that does not include the binding agent(s) utilized in the non-migratory additives of the present invention.

Additive B is Genioplast P, which is an ultra high molecular weight silicone additive comprised of a combination of 100 parts methyl vinyl functional polydiorganosiloxane with up to 200 parts fumed silica and up to 20 parts of boric acid.

Additive C is an non-migratory ultra high molecular weight silicone additive compound produced with Shin-Etsu KE76 BS hydroxyl terminated polydimethyl siloxane gum, sold by Shin Etsu Chemical Co. of Tokyo, Japan, in an amount of around 100 parts by weight, with a binding agent, Aerosil 200 fumed silica, sold by Degussa of Frankfurt, Germany, in an amount of 30 parts by weight, and an appropriate part by weight of a process aid, Dow Corning CD 4-2737 hydroxy terminated dimethylsiloxane process aid sold by Dow Corning of Midland, Mich.

These compounded materials were produced with a 0.65 MI/0.904 Density Homo-polymer Polypropylene using a Haake Torque Rheometer with 20:1 L/D Bradender twin screw counter rotating extruder with 4 temperature segments at an rpm ranging from 30 to 50 and a temperature profile of between 375 degrees Fahrenheit and 475 degrees Fahrenheit.

Films of a polypropylene homopolymer with a density of 0.904 g/cc and MFI of 0.65 were produced with and without the additives A-C using a 25:1 L/D Brabender single screw with a blown film die. The extruded blown film was collected on a vertical blown film tower. During extrusion the torque values were measured at 30 rpm to observe any process aid attributes resulting from the increased lubricity. The results in Table 1 show that the inventive compounds process well and in fact lower torque on the extruder which is desirable. The control was the polymer with no additive present.

TABLE 1

| | % Additive | Additive | Torque |
| --- | --- | --- | --- |
| 1 | 0.0% | Control | 30.00 |
| 2 | 5.0% | Additive B | 12.00 |
| 3 | 2.0% | Additive A | 9.60 |

Static coefficient of friction (COF) can be a proxy measurement to determine the presence of the additive on the surface of a film. Reduction of COF indicates the relative amount of silicone additive available to promote release. The static COF measurements were performed film on film with an increasing angle arm device. The test specimens were formed of the same polypropylene material used in the prior testing, and were approximately 1"×4" are attached to the aluminum lever arm and a 150 g steel block with a face dimension of 1'×2". The arm raises until the block begins to move. The angle of the arm is measured when the blocks slides and in converted to COF by the calculating the tangent of the angle. The dynamic surface tension was directly measured. However, visual observations were made on the amount of pressure required to keep the "slide" of the block going. The results disclosed in Table 2 demonstrate that the additives formed according to the present invention (B and C) can reduce the COF as much or more than additive (A) currently used for this purpose.

TABLE 2

|   | % Additive | Additive | COF |
|---|---|---|---|
| 1 | 0.0% | Control | 0.42 |
| 2 | 4.0% | Additive A | 0.29 |
| 3 | 5.0% | Additive B | 0.27 |
| 4 | 5.0% | Additive C | 0.28 |

Demolding was evaluated by placing compounded pellets of the polypropylene thermoplastic material both including and omitting the additives A-C into aluminum mold dishes and heated for 2 hours at 21° C. so the pellets melted and coalesced. The molds were cooled to room temperature and the molded puck was removed from the mold. The difficulty of removal was given a scale from 1 to 10 where 1 is given when the puck falls out of the mold with no force and 10 being fused to the mold and destruction of the puck would be necessary. The scale in between is the approximate force required to separate the puck from the mold. The clarity of the puck was observed as well. The control material in highly translucent and that was given a 1 rating and 2 indicates an significant increase in haze and 3 is opaque. These results are provided in Table 3.

It can be seen that the use of the additives have a dramatic impact on demolding over the control. The tethered additives B and C performed as well as the un-tethered siloxane A and much better than the control containing no additive. The clarity is reduced however.

TABLE 3

|   | Release Additive | Adhesion Rating | Clarity Rating |
|---|---|---|---|
| 1 | Control | 9.5 | 1 |
| 2 | 5% Additive A | 3.5 | 1 |
| 3 | 10% Additive B | 2 | 3 |
| 4 | 10% Additive C | 3.5 | 2 |

Adhesive properties or release was measured by testing the blown polypropylene films produced without the additives A-C under TLMI 180 peel test procedures using TESA tape 7475 pulled at 300 inches per minute. The tape laminated samples were conditioned at 140 F for 20 hours before peeling.

For subsequent adhesion, the Finat 11 test procedure was run which applies an unused piece of TESA tape and a piece of tape that has been in touch with the substrate for the 20 hr oven test as in the peel test. The tapes are allowed to dwell on a clean steel plate for twenty minutes and pulled at 12 inches per minute at a 180 degree angle. The result is divided by the control result to get the % subsequent adhesion.

Table 4 demonstrates that these additives do have an adhesive release profile and can act as a melt additive release agent to produce ready to use release liner films. The control was welded to the tape and could not be removed. The most surprising observation was the high percentage subsequent adhesion. This demonstrates that the additive is non-migratory even under harsh heated storage conditions. Additive A, which again does not include the binding agent of the additives of the present invention, is not tethered in the manner as this invention and shows migration to the adhesive interface and low subsequent adhesion. The commercially viable subsequent adhesion level is above 90%.

TABLE 4

|   | % Additive | Additive | 300 ipm Release | % Subseq. Adhesion |
|---|---|---|---|---|
| 1 | 0.0% | Control | Welded | Welded |
| 2 | 5.0% | Additive C | 375.00 | 94 |
| 3 | 5.0% | Additive B | 612.00 | 100 |
| 4 | 4.0% | Additive A | 161.00 | 78 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. More specifically, various other alternatives are contemplated is being within the scope of the following claims particularly pointing out and distinctly claiming the subject matter regarded as the invention.

I claim:

1. A non-migratory additive for a release liner, the additive consisting essentially of:
   a) polydiorganosiloxane compound; and
   b) a binding agent bound to the polydiorganosiloxane compound by hydrogen bonds formed during the formation of the additive, wherein the binding agent is phosphoric acid.

2. The additive of claim 1, wherein the polydiorganosiloxane compound has a molecular weight of at least 60,000 amu.

3. The additive of claim 2, wherein the polydiorganosiloxane compound has a molecular weight of between about 75,000 amu and 2,000,000 amu.

4. The additive of claim 1, wherein the polydiorganosiloxane compound has a viscosity of at least 50 Pa·s.

5. The additive of claim 4, wherein the polydiorganosiloxane compound has a viscosity of at least 60 Pa·s.

6. The additive of claim 1, wherein the polydiorganosiloxane compound has at least one side chain selected from the group consisting of: C1-C60 alkyl groups, aromatic rings, hydrogen, hydroxyl groups, vinyl groups and phenyl groups.

7. A release liner composition comprising:
   a) approximately 100 parts by weight of a thermoplastic polymer;
   b) 0.01-20 parts by weight of a non-migratory additive consisting essentially of a polydiorganosiloxane compound and a binding agent bound to the polydiorganosiloxane compound by hydrogen bonds formed during the formation of the additive; and
   c) optionally 0.001 to 120 parts of other known process aids such as fillers, pigments, process aids, stabilizers and melt flow modifiers, wherein the binding agent is phosphoric acid.

8. A method for forming a release liner comprising the steps of:
   a) providing a thermoplastic polymer, a non-migratory additive consisting essentially of a polydiorganosiloxane compound and a binding agent bound to the polydiorganosiloxane compound by hydrogen bonds formed during the formation of the additive, and optionally other known process aids such as fillers, pigments, process aids, stabilizers and melt flow modifiers, wherein the binding agent is phosphoric acid;
b) compounding the thermoplastic polymer, the non-migratory additive, and optionally other known process aids into a release liner composition; and
c) extruding the release liner composition into a liner film.

9. A method for forming a release liner additive comprising the steps of:
a) providing a polydiorganosiloxane compound, a binding agent bound to the polydiorganosiloxane compound by hydrogen bonds formed during the formation of the additive, and optionally other known process aids such as fillers, pigments, process aids, stabilizers and melt flow modifiers, wherein the binding agent is phosphoric acid;
b) compounding the polydiorganosiloxane compound, the binding component and optionally the other known process aids into an additive composition.

* * * * *